(12) United States Patent
Cox-Muranami et al.

(10) Patent No.: US 11,291,998 B2
(45) Date of Patent: Apr. 5, 2022

(54) FLUID CACHING

(71) Applicants: Illumina, Inc., San Diego, CA (US); Illumina Cambridge Limited, Cambridge (GB)

(72) Inventors: Wesley A. Cox-Muranami, San Diego, CA (US); Darren Robert Segale, San Diego, CA (US); Oliver Jon Miller, Cambridge (GB); Jennifer Olivia Foley, San Diego, CA (US); Tarun Kumar Khurana, San Diego, CA (US); Paul Crivelli, San Diego, CA (US); Gary Watts, San Diego, CA (US)

(73) Assignees: Illumina, Inc., San Diego, CA (US); Illumina Cambridge Limited, Cambridge (GB)

( * ) Notice: Subject to any disclaimer, the term of this patent is extended or adjusted under 35 U.S.C. 154(b) by 0 days.

(21) Appl. No.: 17/165,757

(22) Filed: Feb. 2, 2021

(65) Prior Publication Data

US 2021/0154667 A1 May 27, 2021

Related U.S. Application Data

(63) Continuation of application No. 16/244,776, filed on Jan. 10, 2019, now Pat. No. 10,953,399.

(Continued)

(51) Int. Cl.
*B01L 3/00* (2006.01)
*G01N 1/31* (2006.01)
*B01L 9/00* (2006.01)

(52) U.S. Cl.
CPC ... *B01L 3/502746* (2013.01); *B01L 3/502715* (2013.01); *G01N 1/31* (2013.01);
(Continued)

(58) Field of Classification Search
CPC ......... B01L 3/502746; B01L 3/502715; B01L 3/50273; B01L 3/502738; B01L 3/52;
(Continued)

(56) References Cited

U.S. PATENT DOCUMENTS 6,264,891 B1 7/2001 Heyneker et al.
7,871,827 B2 1/2011 Parthasarathy et al.
(Continued)

FOREIGN PATENT DOCUMENTS

CN 1415058 4/2003
CN 101349355 1/2009
(Continued)

OTHER PUBLICATIONS

International Search Report and Written Opinion dated Apr. 23, 2019 issued in International Application No. PCT/US2019/013002. (9 pages).

*Primary Examiner* — Jennifer Wecker
*Assistant Examiner* — Michael Paul Shimek
(74) *Attorney, Agent, or Firm* — Rothwell, Figg, Ernst & Manbeck, P.C.

(57) ABSTRACT

An apparatus for directing fluid into and out of a fluidic device includes two or more fluid prime channels connected to a fluid inlet of the fluidic device, a flow control valve for each fluid prime channel to control flow between the fluid prime channel and the fluid inlet, one or more outlet channels connected to a fluid outlet of the fluidic device, and a flow control valve for each outlet channel to control flow between the fluid outlet and the associated outlet channel. An apparatus for delivering fluids to a fluid inlet includes a plate that is rotatable about an axis of rotation and a plurality of fluid compartments disposed on the plate, each compartment having a fluid exit port disposed at a common radial distance from the axis of rotation and positioned to align (Continued)

with the fluid inlet as the plate rotates about the axis of rotation.

14 Claims, 8 Drawing Sheets

Related U.S. Application Data (60) Provisional application No. 62/621,270, filed on Jan. 24, 2018.

(52) U.S. Cl.
CPC ..... *B01L 3/50273* (2013.01); *B01L 3/502738* (2013.01); *B01L 3/52* (2013.01); *B01L 3/527* (2013.01); *B01L 9/527* (2013.01); *B01L 2200/027* (2013.01); *B01L 2300/0803* (2013.01); *B01L 2300/0806* (2013.01); *B01L 2400/0409* (2013.01); *B01L 2400/0644* (2013.01); *B01L 2400/0655* (2013.01)

(58) Field of Classification Search
CPC .... B01L 3/527; B01L 9/527; B01L 2200/027; B01L 2300/0803; B01L 2300/0806; B01L 2400/0409; B01L 2400/0644; B01L 2400/0655; B01L 3/502707; G01N 1/31; G01N 35/08
See application file for complete search history.

(56) References Cited

U.S. PATENT DOCUMENTS

| | | |
|---|---|---|
| 8,846,378 B2 | 9/2014 | Schultz et al. |
| 9,046,454 B2 | 6/2015 | Strong |
| 2006/0121600 A1 | 6/2006 | Kanegasaki |
| 2006/0182664 A1 | 8/2006 | Peck et al. |
| 2009/0020722 A1 | 1/2009 | Akinori |
| 2010/0224255 A1 | 9/2010 | Mathies et al. |
| 2011/0236273 A1* | 9/2011 | Claussen ................ G01N 1/405 422/187 |
| 2014/0161686 A1 | 6/2014 | Bort et al. |
| 2017/0227525 A1 | 8/2017 | Griffith et al. |
| 2019/0224676 A1 | 7/2019 | Cox-Muranami et al. |

FOREIGN PATENT DOCUMENTS

| | | |
|---|---|---|
| CN | 101675170 | 3/2010 |
| CN | 103533985 | 1/2014 |
| CN | 104470635 | 3/2015 |
| CN | 104661517 | 5/2015 |
| CN | 105032512 A | 11/2015 |
| CN | 205435775 U | 8/2016 |
| CN | 107532119 A | 1/2018 |
| JP | 2005-195561 A | 7/2005 |
| JP | 2006234590 | 9/2006 |
| JP | 2015096257 | 5/2015 |
| JP | 2015515263 | 5/2015 |
| JP | 2016521350 | 7/2016 |
| JP | 2017-42101 A | 3/2017 |
| KR | 10-2017-0015974 A | 2/2017 |
| KR | 10-2017-0142991 A | 12/2017 |
| RU | 2543183 | 2/2015 |
| RU | 2557511 | 7/2015 |
| WO | 1997/016561 A1 | 5/1997 |
| WO | 2001/040688 | 6/2001 |
| WO | 02/18902 A1 | 3/2002 |
| WO | 2006/027757 | 3/2006 |
| WO | 2008/106719 | 9/2008 |
| WO | 2012/170732 | 6/2013 |
| WO | 2013/130714 | 9/2013 |
| WO | 2014/005669 | 1/2014 |
| WO | 2014/014856 | 1/2014 |
| WO | 2014/144789 | 9/2014 |
| WO | 2017/141362 A1 | 8/2017 |

* cited by examiner

FIG. 14 under 35 U.S.C. § 120
FLUID CACHING

CROSS REFERENCE TO RELATED APPLICATION

This application claims the benefit under 35 U.S.C. § 120 of the filing date of non-provisional patent application Ser. No. 16/244,776 filed Jan. 10, 2019, which claims the benefit under 35 U.S.C. § 119(e) of the filing date of provisional patent application Ser. No. 62/621,270 filed Jan. 24, 2018, the disclosure of which is incorporated herein by reference.

BACKGROUND

The need to load and store excessive fluid volumes on disposable microfluidic cartridges can be problematic due to, for example, limited space availability. On the other hand, storing fluids, such as reagents, away from the fluidic region of interest (e.g., a flow cell) can lead to the problem of excessive pump times for moving fluids from the storage location to the fluidic region of interest and presents high flush factor requirements to replace fluids at the region of interest.

Many microfluidic systems with onboard fluid storage house the fluids away from the fluidic region of interest and have some form of valving, whether it be a rotary valve or an array of pinch valves, which adds further distance between the fluids and where they are used on the cartridge. These distances, known as swept volumes, are used to calculate the total volume delivered for a specific chemistry step and thus the further the fluids are stored away from the fluidic region of interest, the more volume is involved per step. For chemistries with many repetitive steps, these used volumes get multiplied, for example, by values ranging from 300 to 600 and thus the total swept volume can have a significant effect on the total fluid volumes required. As fluid volume requirements are the primary driver for microfluidic device size, large swept volumes greatly limit device size reduction potential.

Some microfluidic cartridge devices use fluid volumes that are larger than the volumes need for the onboard chemistry. Such high volumes may be used, for example, for flushing to exchange fluids through shared common lines and at the target surface. Such high fluid volume needs may become even more acute when long, cyclical assays are to be automated. Long fluid lines used to transport fluids that are stored remotely from the fluidic region of interest can present hard to wash locations within a microfluidic pathway, such as ninety degree turns. In addition, the walls of the fluid line may be hard to wash due to no-slip boundary condition in laminar flow environments.

In standard microfluidic systems, priming may be performed in channels located at the fluid storage region away from the fluidic region of interest with channels feeding into a shared switching valve which enables on-demand fluid selection. A long shared line, or common line, then transports all of the fluids to the fluidic region of interest where fluidic exchange occurs. In such standard systems, before a different fluid is to be provided at the fluidic region of interest, the previous fluid may be flushed out to preserve the correct chemical composition of the new fluid or to avoid hindrance by opposing chemistries (i.e., avoid cross-contamination).

The volume of fluid needed to flush a common line prior to addition of a different fluid will depend on the length of the common line and is known as the "swept volume." A "flush factor" may be thought of as a multiplier to be applied to the total swept volume, or volume of channels shared by the fluids. For example, if a swept line is 10 µL in volume, a flush factor of 3 would require 30 µL of a fluid to be pulled through the system to generate proper exchange. For cyclical chemistry assays with many repetitions, minimizing individual fluid transfer volumes has a significant impact on the overall volumes to be stored on the fluidic devices. By minimizing the store volumes, cartridge footprints can be reduced and money is saved on a per run basis due to a reduction in materials and fluids. In some instances, total run time may be reduced due to shorter pumping operation times.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass an apparatus comprising two or more fluid prime channels connected to a fluid inlet of a fluidic device, a flow control valve operatively associated with each fluid prime channel to control flow between the associated fluid prime channel and the fluid inlet, one or more outlet channels connected to a fluid outlet of the fluidic device, and a flow control valve operatively associated with each outlet channel to control flow between the fluid outlet and the associated outlet channel.

Aspects of the disclosure encompass a method comprising caching a different fluid in each of two or more fluid prime channels connected to a fluid inlet of a fluidic device, wherein a flow control valve operatively associated with each fluid prime channel controls flow between the associated fluid prime channel and the fluid inlet, moving at least a portion of a first fluid in a first of the two or more fluid prime channels into the fluid inlet, moving the first fluid through a fluid outlet of the fluidic device into an outlet channel connected to the fluid outlet, wherein a flow control valve operatively associated with the outlet channel controls flow between the fluid outlet and the outlet channel, moving at least a portion of a second fluid in a second of the two or more fluid prime channels through a shared fluid prime channel connecting the first and second fluid prime channels to the fluid inlet to flush the shared fluid prime channel, and moving at least a portion of the second fluid in the second fluid prime channel into the fluid inlet.

Aspects of the disclosure encompass an apparatus comprising a plate that is rotatable about an axis of rotation that is orthogonal to a surface of the plate and a plurality of fluid compartments disposed on the plate, each compartment having a fluid exit port formed through the plate, wherein the fluid exit ports of the plurality of fluid compartments are disposed at a common radial distance from the axis of rotation, and wherein each exit port is positioned to align with a fluid inlet of a fluidic device as the plate rotates about the axis of rotation.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

Rotary Fluid Storage Tray

In various examples, an apparatus for delivery of fluids to a fluid inlet of a fluidic device (e.g., a fluidic "target", a fluidic region of interest, etc.) may comprise a rotary fluid storage tray that may be a part of a larger microfluidic cartridge device with the ability to directly supply selected fluids on demand to the fluid inlet. In the context of this disclosure, a fluidic device may comprise any device through which a fluid flows from a fluid inlet into the device and optionally to a fluid outlet, from which the fluid flows from the device, and may comprise a device within which fluid processing, such as a chemical or biochemical assay or other reaction, takes place. The fluidic device may or may not be a microfluidic device. The rotary fluid storage tray avoids the challenge of a long swept volume by being configured to allow direct coupling of fluid storage wells to the fluid inlet of the fluidic device.

Figure 1:
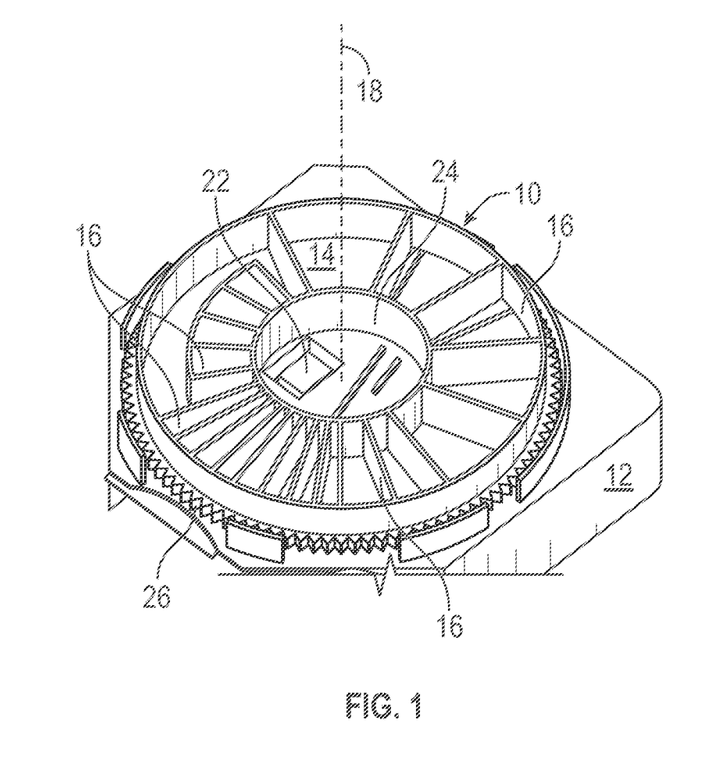
FIG. 1 is a top perspective view of an example rotary fluid tray mounted to a fluidic device.
Figure 2:
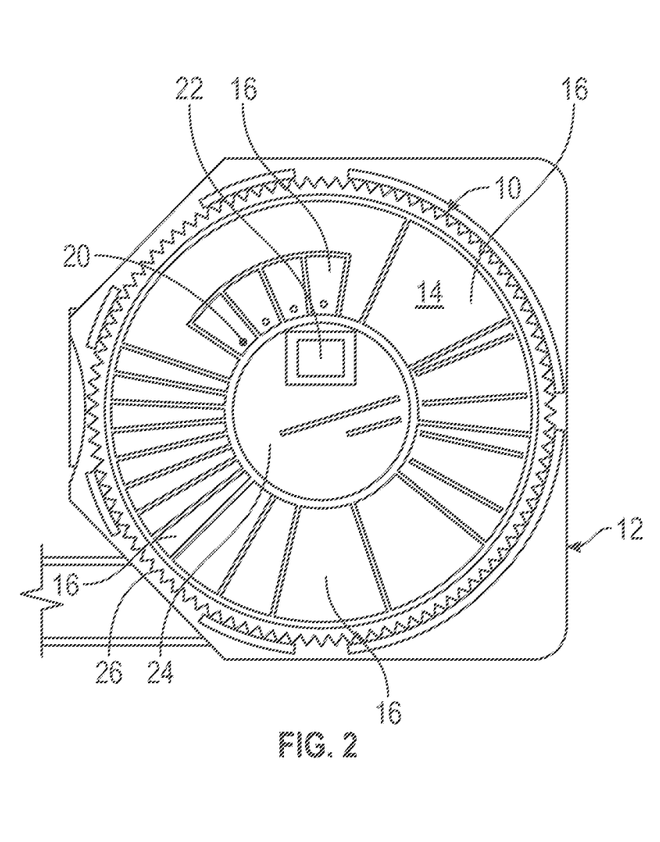
FIG. 2 is a top plan view of an example rotary fluid tray.

FIG. 1 is a top perspective view of a rotary fluid storage tray mounted to a fluidic device, and FIG. 2 is a top plan view of the rotary fluid storage tray. A rotary fluid storage tray 10 is shown mounted onto a microfluidic cartridge device 12. The tray 10 comprises a plate 14 with fluid compartments, or wells, 16 supported thereon. In various examples, the tray 10 is circular and is configured to rotate about an axis of rotation 18 that is orthogonal to the plate 14 and which, in various examples, may correspond to the axis of rotation of the circular plate 14. The multiple fluid compartments 16 supported on the plate 14 may have variable sizes depending on the necessary storage volume of the reagents or other fluid to be stored in each well.

In various examples, the rotary fluid storage tray 10 will be a solid, circular piece of plastic with wedge-shaped fluid storage wells 16 erected on top. Suitable plastics include polypropylene, polycarbonate, Ultem® (polyetherimide), and polyurethane. The tray 10 may be a disposable component, but the same design features can be applied to non-disposables as well.

Each compartment 16 includes an exit port or via 20 formed through the plate 10. Fluid flow through each exit port may be controlled by a suitable valve that is selectively actuated by a push rod or other actuator that, in various examples, may extend through and/or be supported on a lid disposed over the tray 10 as described in further detail below.

The fluid tray 10 is aligned to the fluidic device 12 in a way which directly places the fluid compartment exit ports 20 directly above a fluid inlet to the fluidic device 12, for example an entrance to a flow cell 22, which may be disposed in an open central region 24 of the rotary fluid storage tray 10, when the tray 10 is rotated. In various examples, the exit port 20 of each fluid compartment is located at the same radial distance from the axis of rotation 18 to thereby place the exit ports at a common location as the tray 10 is rotated.

Depending on the configuration of the fluidic device to be paired with the rotary fluid storage tray, the exit ports could either be located on the outer circumference of the tray circle, or near the midpoint. In other examples, the exit ports may be located at any position along the radius of the plate. For the latter via placement option, the fluid tray may be in the shape of a rectangular toroid where the midsection of the tray is empty to allow for other cartridge components, such as the flow cell, to reside within the interior of the tray. See, for example, open central space 24 in tray 10 of FIGS. 1 and 2.

Figure 3:
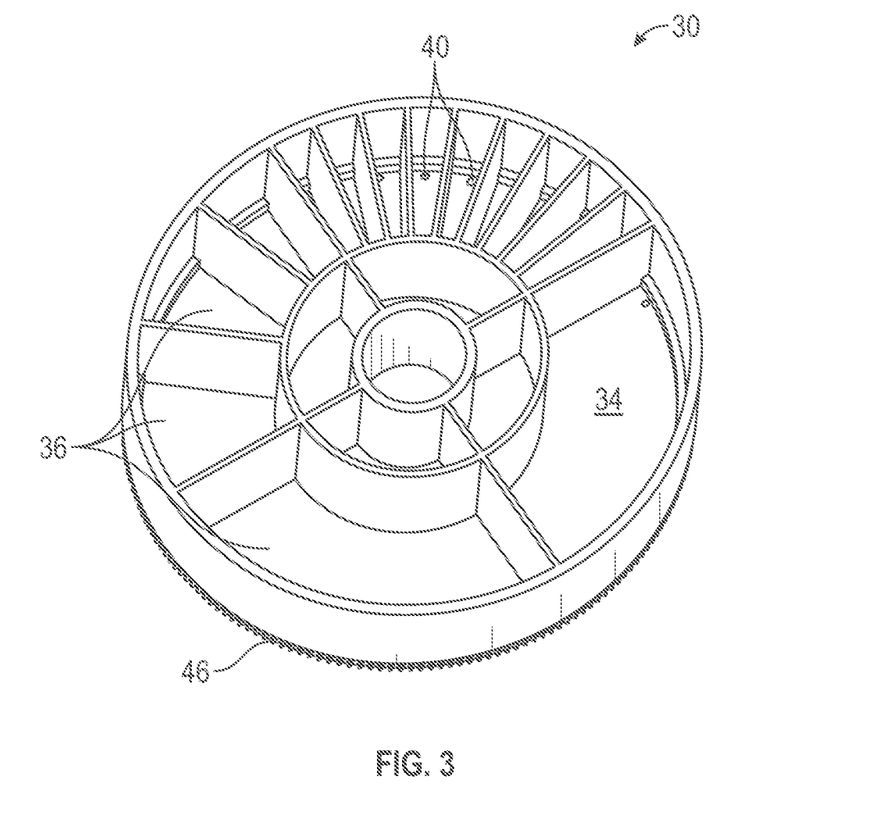
FIG. 3 is a perspective view of an alternative example of a rotary fluid tray.

FIG. 3 is a perspective view of an alternative example of a rotary fluid storage tray 30. Rotary storage tray 30 includes a rotary plate 34, circular in various examples, with fluid wells 36 disposed thereon and having exit ports 40 formed through the plate 34 near the outer periphery of the tray 30. This configuration of the tray 30 enables a different style of fluidic architecture to be paired to the tray. In contrast to the tray 10 shown in FIGS. 1 and 2, tray 30 lacks an open, central space 24 for components, such as the flow cell, within the center region of the tray 30.

In various examples of the rotary fluid storage tray 10, 30, automated control and monitoring of the speed and angular position of the tray may be provided. The tray may be coupled to a motor or other motive means, for example, by gears, belts, pulleys, drive shafts, etc., so as to provide automated, on-demand powered rotation of the tray. Angular position control and monitoring of the tray may be provided by rotational position sensors, e.g., encoders, and/or stepper motors.

In various examples, automated rotation of the rotary fluid storage tray to align an exit port of a selected fluid compartment with the fluid inlet of the fluidic device is achieved by coupling a motorized gear drive system to mating gear teeth formed about the periphery of the tray. For example, tray 10 may include peripheral gear teeth 26 for coupling the tray 10 to a motor, e.g., by a gear (e.g., a pinion gear) or belt, to enable powered rotation of the tray 10 to select among the various compartments 16, by aligning their exit ports 20 to the inlet of the fluidic device. Similarly, tray 30 may include peripheral gear teeth 46 for coupling the tray 30 to a motor, e.g., by a gear (e.g., a pinion gear) or belt, to enable powered rotation of the tray 30 to select among the various compartments 36, by aligning their exit ports 40 to the inlet of the fluidic device.

The interface between the rotary plate 14 of the tray 10 and the plate 34 of the tray 30 and the fluidic device may include an elastomer in order to form a complete fluidic seal between the fluid exit port of the tray and the fluid inlet of the fluidic device. In various examples, the elastomer may be overmolded to the bottom of the plate 14 or 34 and will be composed of a material with low stiction (i.e., the friction that tends to prevent stationary surfaces from being set in motion) to avoid excessive torque requirements, e.g. approximately 0.3 newton-meters, or less, for turning the tray 10, 30 while it is compressed onto the fluidic device. Suitable elastomers may include thermoplastic elastomers, such as Dynaflex®, Santoprene®, and silicone.

In various examples, the design of the rotary fluid storage tray accommodates actuation points for both clamping the tray to form seals between the rotary plate and the fluidic device and rotating the tray in a non-obtrusive manner. Accordingly, in various examples, gear teeth 26, 46 are formed on the outer periphery of the respective tray 10, 30. Clamping force can be effected by compressing at top edges of the well tray with a low friction material.

Figure 4:
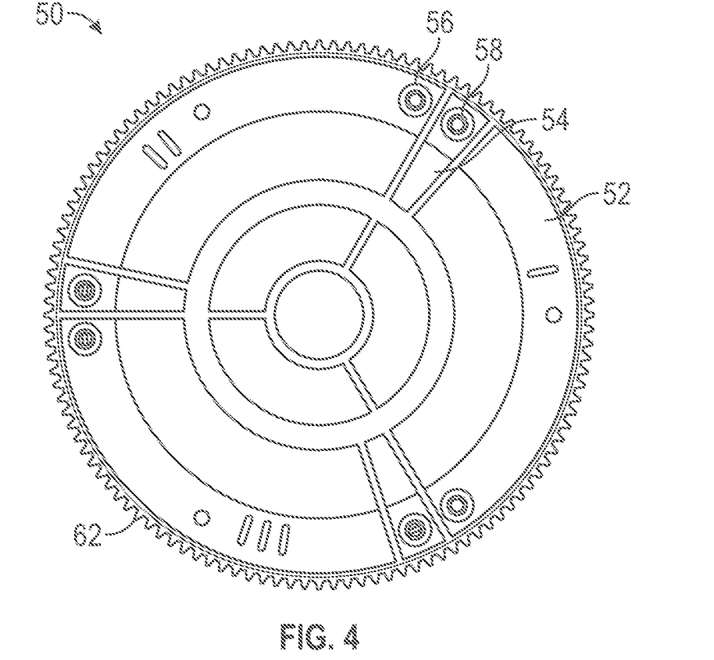
FIG. 4 is a top plan view of an example rotary fluid tray.
Figure 5:
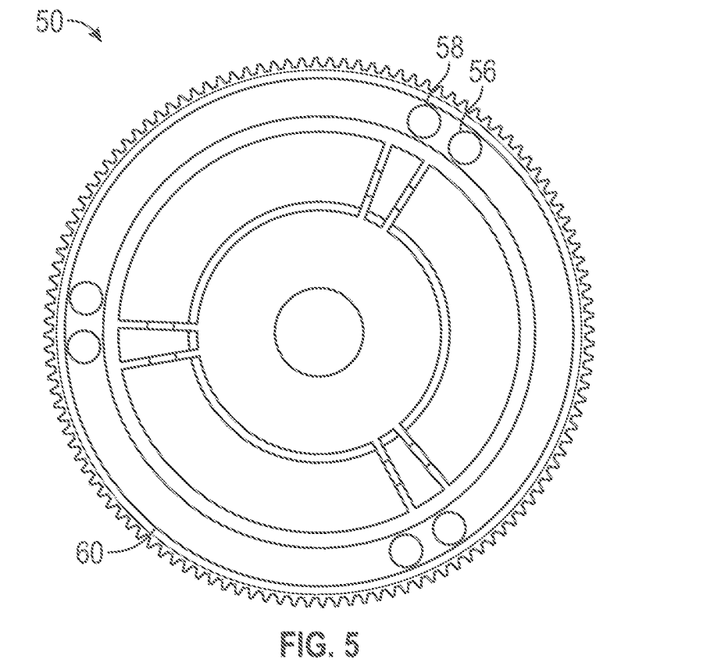
FIG. 5 is a bottom plan view of the rotary fluid tray shown in FIG. 4.

FIGS. 4 and 5 are, respectively, top and bottom plan views of an alternative example of a rotary fluid storage tray 50. Rotary storage tray 50 includes a rotary plate, circular in various examples, with fluid wells 52, 54 disposed thereon and having exit ports covered by valves 56, 54, respectively, formed through the plate near the outer periphery of the tray. Tray 50 may include peripheral gear teeth 62 for coupling the tray 50 to a motor, e.g., by a gear (e.g., a pinion gear) or belt, to enable powered rotation of the tray 50.

Figure 6:
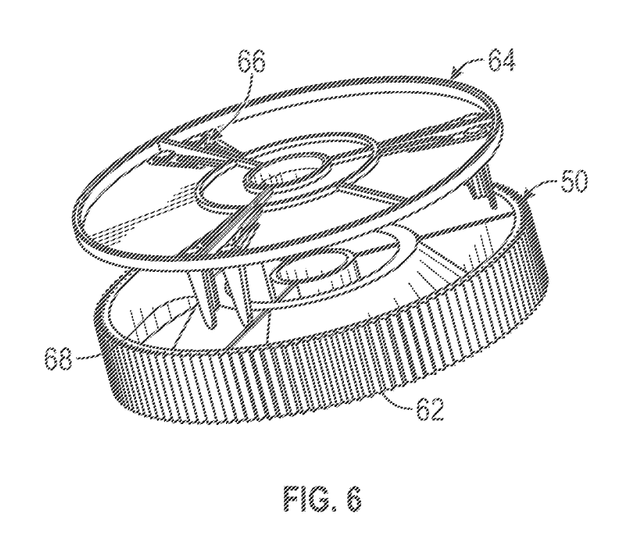
FIG. 6 is an exploded perspective view of an example rotary fluid tray and a lid.
Figure 7:
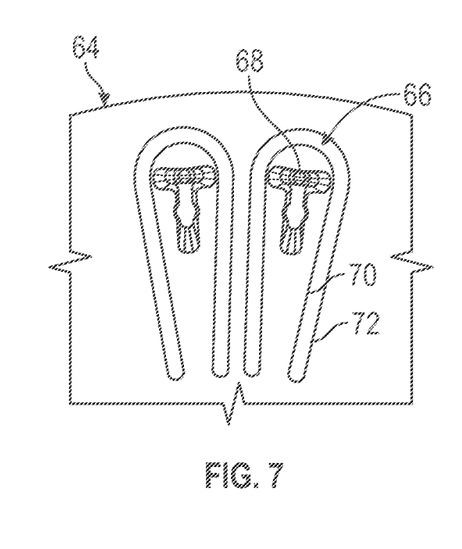
FIG. 7 is a partial bottom plan view of the lid shown in FIG. 6.

FIG. 6 is an exploded, perspective view of the rotary fluid tray 50 and a lid 64. Lid 64 includes valve actuators 66 configured to selectively open the valves 56 and 58 of the tray 50. In the illustrated example, each valve actuator includes a flexible tab 70 formed in the lid 64 by a slot 72 defining the perimeter of the tab. A push rod 68 extends below the tab 70.

Figure 9:
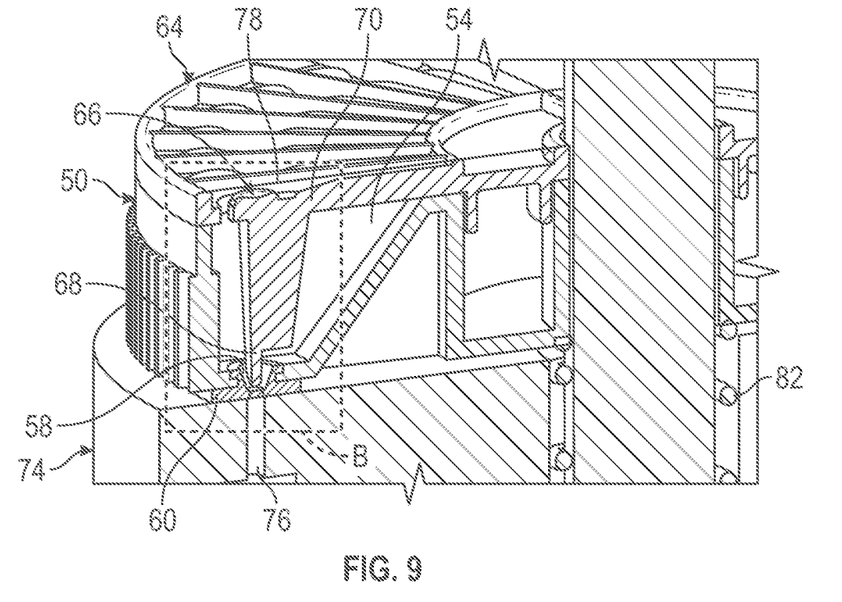
FIG. 9 is transverse cross-section along the line A-A in FIG. 6.
Figure 10:
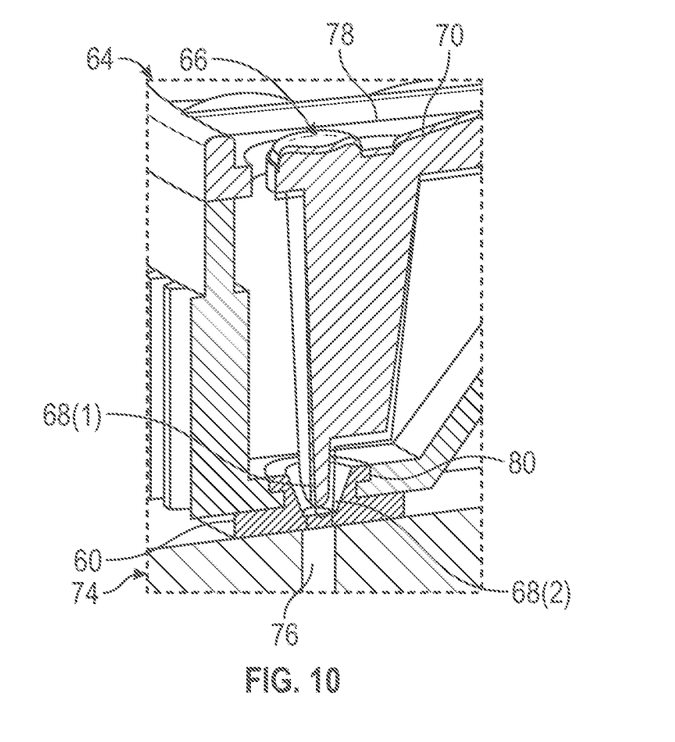
FIG. 10 is a partial cross-section of area B in FIG. 9.

As shown in FIGS. 9 and 10, which are cross-sectional views of the valve actuator 66, the pushrod extends below the tab to a position 68(1) in FIG. 10 just above the valve 58. When the tab 70 is deflected downwardly by application of a force onto the valve actuator 66, the point of the pushrod extends into the valve 58 to position 68(2). A ring of elastomeric material 60 (see also FIG. 5) on the bottom surface of the tray 50 includes a projection or button 80 that extends into the aperture formed in the bottom of the well of the tray. The projection may have a slit septum formed therein to form the valve 58, and the valve opens when the point of the pushrod 68 is pushed into the slit and closes when the pushrod is withdrawn. The aperture of the well is aligned with a channel 76 of a fluidic device 74. In one example, the pushrod 68 deflects split septum seal enough to open the valve 58 and allow a syringe pump to draw fluid from the storage well.

As shown in FIGS. 9 and 10, the elastomeric ring 60 forms a seal between a fluidic device 74 and the bottom of the tray 50 around the interface of the channel 76 and the aperture of the well. The tray 50 and the fluidic device 74 may be held in tight contact with each other by a component or mechanism, such as a spring 82.

A flexible seal 78 may be provided over the lid 64. Seal 78 may be provided to prevent debris from falling into the slots 72 of the valve actuators 66.

Figure 8A:
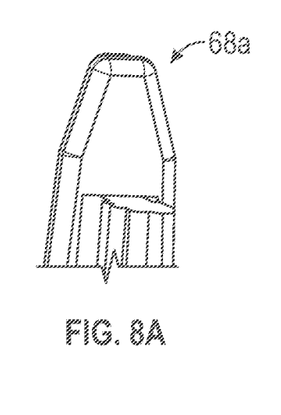
FIGS. 8(A), 8(B), 8(C) are partial perspective views of different push rod tip configurations.
Figure 8B:
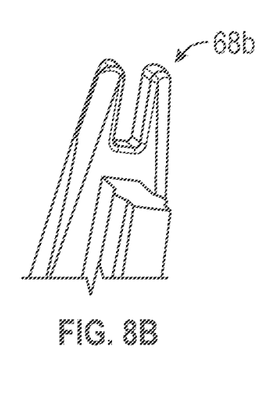
Figure 8C:
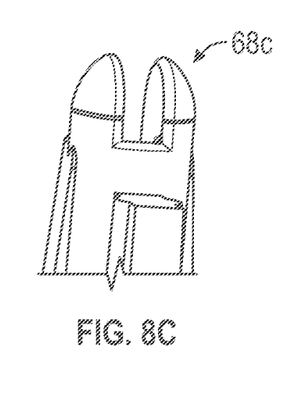

FIG. 8 shows alternative configurations for the tip of a pushrod 68. In FIG. 8(A) pushrod 68a has a single blunted point configuration. In FIG. 8(B), pushrod 68b has a bifurcated point configuration. And in FIG. 8(C), pushrod 68c has a bifurcated configuration with a semi-circular transverse profile.

Fluid Priming Manifold

In accordance with examples described herein, an apparatus for directing fluid into and out of a device having a fluid inlet and a fluid outlet may comprise a fluidic manifold to be coupled with or integrated into a fluidic device requiring fluidic exchanges at a single in-line location is described. In this context the in-line location will be referred to as a fluid inlet of the fluidic device. The manifold is configured to allow the priming of reagents or other fluids up to a very short shared fluidic line, or common line, feeding into the fluid inlet. The terms "priming," "caching, "prime", or "cache" in this context describes the act of staging fluids or other fluids by pushing or pulling the fluids into their dedicated channels before delivery to and use within the fluidic device.

Figure 11:
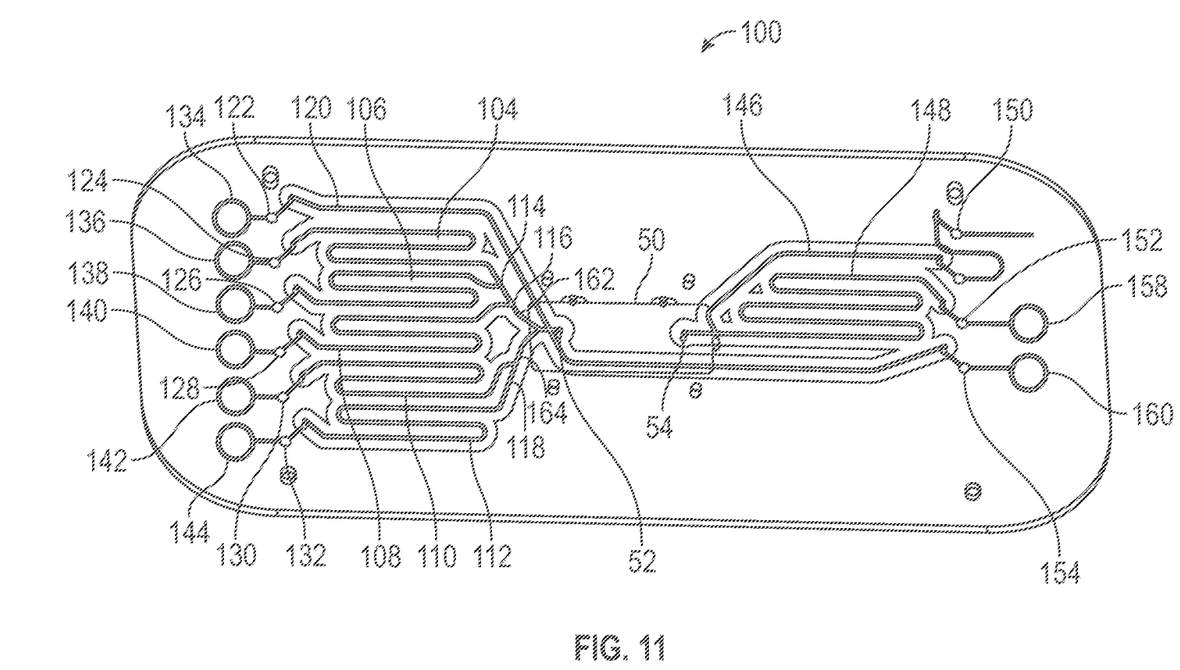
FIG. 11 is a perspective view of an example fluid priming manifold.

As shown in FIG. 11, an example apparatus for directing fluid into and out of a device having a fluid inlet and a fluid outlet comprises fluid priming manifold 100. The manifold 100 is built upon a substrate 102 on which is supported or to which is coupled a fluidic device 50, e.g., a flow cell, having a fluid inlet 52 and a fluid outlet 54.

The manifold 100 includes two or more fluid prime channels 104, 106, 108, 110, 112 (five fluid prime channels in the illustrated example although the manifold may include more than or fewer than five fluid prime channels) and a bypass lines 120. One or more of the fluid prime channels 104, 106, 108, 110, 112 may have a serpentine configuration to maximize the amount of fluid that can be cached in the channel. The fluid prime channels 104, 106, 108, 110, 112 converge just before fluid inlet 52 and are in fluid communication with the fluid inlet 52 where fluid exchanges may take place. In the illustrated example, two distinct common lines 162, 164 are formed just before the fluid inlet 52 where the fluid prime channels 104, 106, 108, 110, 112 converge to enter the fluidic device 50 from the same port location at fluid inlet 52. The separated convergence paths keep fluids (e.g., reagents) that are sensitive to one another separated while keeping a single entrance point on the fluidic device 50.

In various examples, individual valve locations 124, 126, 128, 130, 132 are each operatively associated with one of the fluid prime channels 104, 106, 108, 110, 112, respectively, to enable the selection of which fluid prime channel is to be addressed during fluid transfer. An individual valve location 122 is operatively associated with the bypass line 120.

In this context a valve that is operatively associated with a channel is coupled to the channel in such a manner that selective actuation of the valve will selectively permit or prevent fluid flow through the associated channel and/or selectively control a fluid flow rate through the channel.

Connectors, or fittings, 136, 138, 140, 142, 144 may be provided to connect each of the fluid prime channels 104, 106, 108, 110, 112, respectively, to a source of fluid. In an example, connectors 136, 138, 140, 142, 144 may connect to a common channel directing fluid from a fluid inlet that is coupled to a rotary fluid storage tray (described above) carrying each of the different fluids to be primed, or cached, in fluid prime channels 104, 106, 108, 110, 112. A connector 134 may be associated with the bypass line 120. In various examples bypass channel 120 may include a second valve 154 at an opposite end from valve 122. Bypass channel 120 may further include a connector 160. In various examples, the fluid prime channels 104, 106, 108, 110, 112 and the associated valves at valve locations 124, 126, 128, 130, 132 are physically separated from the primary storage region(s) of the fluids from which fluid flow into the fluid prime channels.

Each fluid prime channel 104, 106, 108, 110, 112 is dedicated to a single reagent or other fluid to be primed for use in the fluidic device 50. Switching flow between each individual channels is achieved by manipulating valves 124, 126, 128, 130, 132 placed between the prime channels and source of fluid for each channel. In various examples, the valves 124, 126, 128, 130, 132 may be composed of small rounded dips fabricated to be the entrance of each, associated fluid prime channel 104, 106, 108, 110, 112, respectively, and can be compressed with external pinch rods to seal their corresponding channels. In various examples, material bonded over the channels should be sufficiently flexible to enable the use of this pinch valve regime. These types of valves are commonly referred to as pinch valves.

Only the channel with the open valve would allow for flow to occur thus generating specified flow of select fluids to their corresponding channels.

Aside from the priming channels, one or more other valved channels exist, such as bypass channel 120, which form a direct sample input line and a bypass channel to a different reaction zone. The bypass channel allows for the flushing out of the common line with air or a wash buffer to avoid contamination during priming with remnants of the previously primed fluids. Bypass channel 120 may be used to introduce air bubbles to separate distinct boluses of different fluids provided to the fluidic device 50 from the prime channels. In other examples, bypass channel 120 can also be used as a reuse cache. For example, for a fluid that is brought through the inlet 52, to avoid having to push that fluid back towards the source well, bypass channel 120 can be used as a temporary storage channel (assuming the fluid volume stored is not larger than the bypass channel internal volume).

Any number of priming channels and others can exist so long as the ability to prime up to the entrance of the flow cell is not hindered by their presence.

Viable options to pinch valves may include other microfluidic valving options including pneumatically actuated elastomeric valves.

Figure 12:
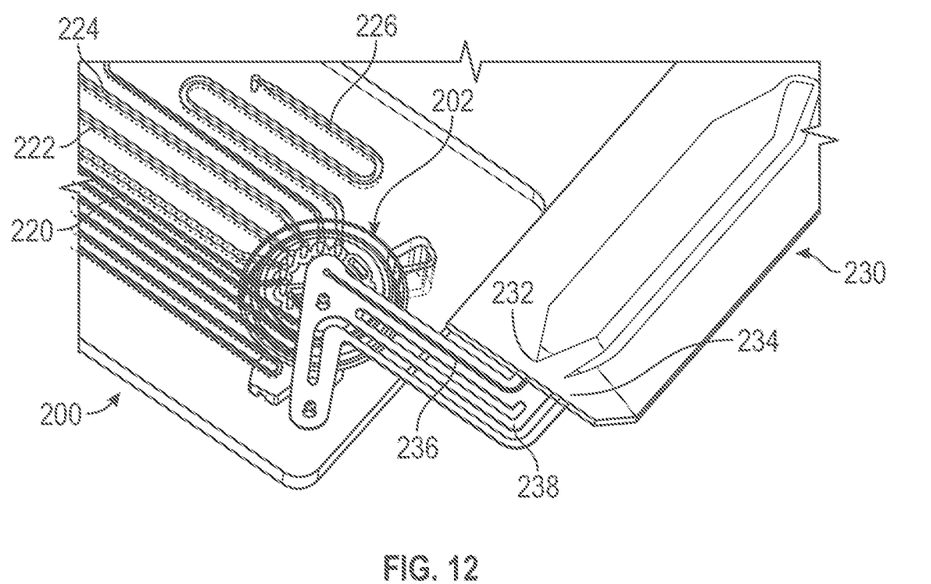
FIG. 12 is a partial top perspective view of a rotary valve assembly for a fluid priming manifold.
Figure 13:
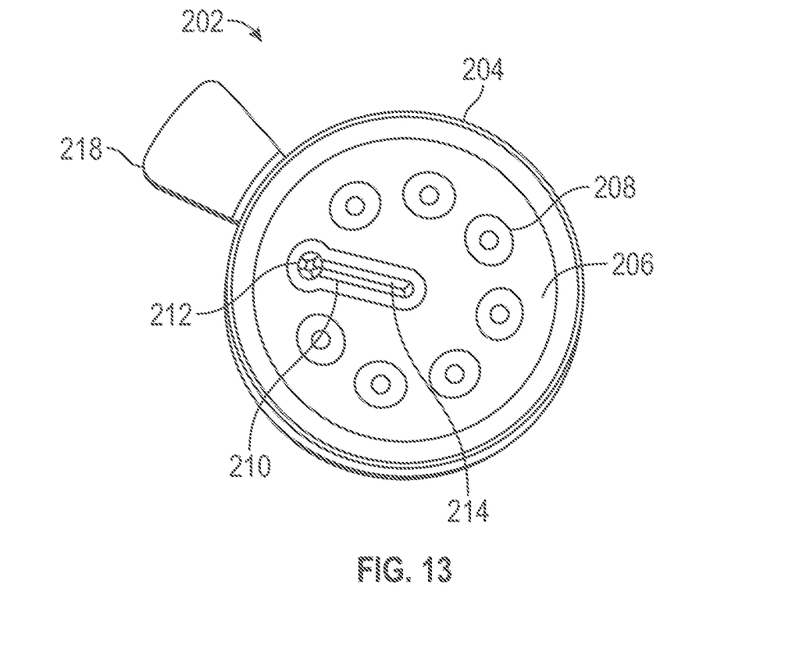
FIG. 13 is a plan view of a rotary valve.
Figure 14:
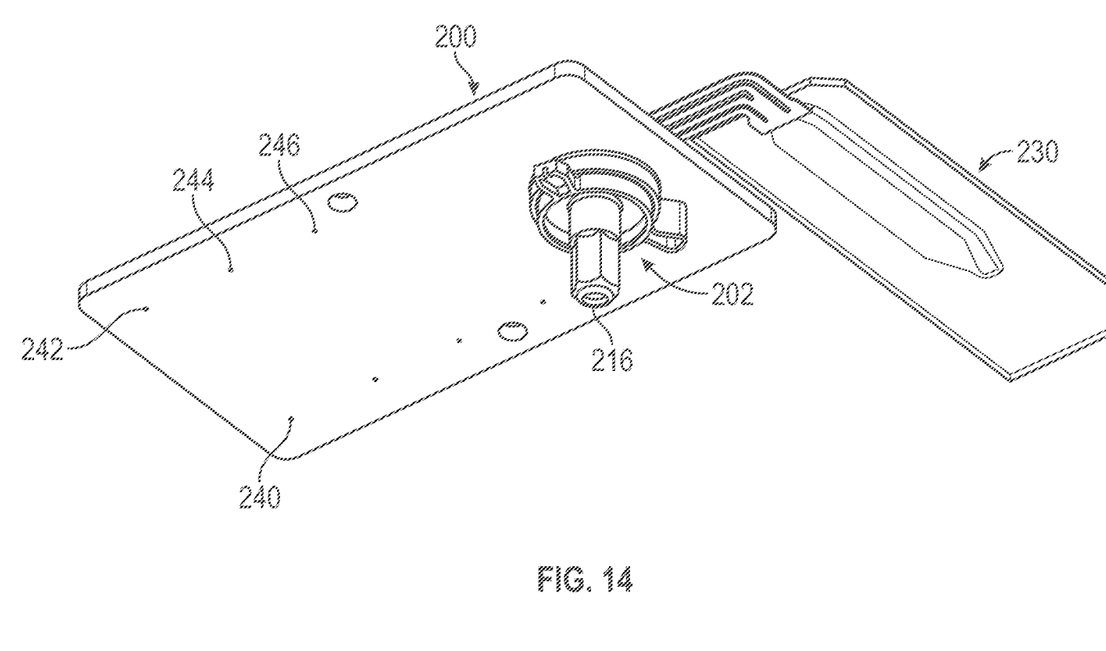
FIG. 14 is a partial bottom perspective view of a rotary valve assembly for a fluid priming manifold.

Another alternative viable alternative to pinch valves includes a rotary valve assembly as shown in FIGS. 12-14. In one example, the rotary valve assembly includes a rotary valve 202 rotatably mounted within a manifold substrate 200 and connected by means of a common inlet line 236 and a common outlet line 238 to the inlet and outlet 232, 234, respectively, of a fluidic device 230, such as a flow cell.

As shown in FIG. 13, in one example, the rotary valve 202 comprises a first disc 204, which may be made from a rigid plastic material, and a elastomeric cap 206 disposed over (e.g., overmolded on) the disc 204. Suitable elastomers for cap 206 may include thermoplastic elastomers, such as Dynaflex®, Santoprene®, and silicone. Cap 206 includes O-rings 208 arranged in a circumferential pattern and a channel 210. As shown in FIG. 14, a shaft 216 may be provided for connecting the rotary valve 202 to a motor or other means for powered rotation. A hard stop arm 218 may be provided for limiting rotation of the valve 202.

A plurality of fluid prime channels 220, 222, 224, 226 are formed in the manifold substrate 200 and may be connected by means of vias 240, 242, 244, 246 to reagent storage vessels (not shown).

Each fluid prime channel 220, 222, 224, 226 terminates at a common radial position with respect to the center of the rotary valve 202. The channel 210 formed in the cap 206 includes an outlet 214 corresponding to the center of the valve 202 and an inlet 212. When the valve 202 is rotated such that the inlet end 212 of the channel 210 is aligned with the terminal end of one of the fluid prime channels 220, 222, 224, 226, fluid may flow from the prime channel into the inlet 212, through the channel 210, into the outlet 214 which is connected to the common inlet line 236. The terminal ends of the remaining, unconnected fluid prime lines will align with one of the O-rings 208 to seal each of the unconnected lines. Thus, the rotary valve can rotate the channel 210 to a selected fluid prime line as all other fluid prime channels are sealed against fluid flow.

The common outlet line 238 may be connected to a pump (not shown) for drawing fluids through the rotary valve assembly and the fluidic device. One or more additional valves, such as pinch valves, may be provided for controlling application of pressure from the pump as well as for controlling outlet fluid flow from the common outlet line 238, for example to provide a bypass and fluid re-use capability and/or for connecting the outlet flow to a waste receptacle.

Certain fluids may be incompatible with each other and are to be kept separated. If these fluids are not kept separated or are not adequately washed out before the next fluid flows through a shared line, subsequent reactions or other processing may be negatively impacted. Various examples of the priming manifold are configured to allow each priming channel to lead into the fluid inlet at a single position while preventing cross contamination. For the example, in the illustrated manifold 100, the inclusion of two common lines 162, 164 leading into the same inlet port 52 (rather than several distinct lines or just one) allows for smart washing of the lines to prevent cross contamination. In the illustrated example, fluid prime channel 104, 106, and 108 are connected to common channel 162 in which fluid prime channel 106 merges with fluid prime channel 104 at junction 114, and fluid prime channel 108 merges with fluid prime channels 104 and 106 at junction 116. The distance from junction 114 to fluid inlet 52 plus the distance from fluid inlet 52 to fluid outlet 54 may be referred to as a swept volume, and the distance from junction 116 to inlet 52 may be referred to as a common line volume. Also in the illustrated example, fluid prime channel 110 and 112 are connected to common channel 164 in which fluid prime channel 110 merges with fluid prime channel 112 at junction 118. The distance from junction 118 to fluid inlet 52 and from 116 to inlet 52 is a swept volume. Ideally, the junctions 114, 116, 118 are as close as possible to the fluid inlet 52 to minimize the swept volumes.

The manifold 100 further includes a fluid outlet channel 148 in fluid communication with the fluid outlet 54. Outlet channel 148 may have a serpentine configuration so as to maximize the amount of fluid that can be cashed their end. In various examples, individual valve location 152 is associated with outlet channel 148 to control flow in the outlet channel. Valve 152 may be a pinch valve or other suitable valve.

A connector 158 may be provided for connecting the outlet channel 148 to a downstream fluidic element, such as a waste chamber, and/or for connecting outlet channel 148 to a source of pressure differential, such as a pump.

A secondary channel 146 extends from the outlet channel 148 and includes a valve 150 for controlling flow through the secondary channel. Secondary channel 146 may be open to air and provides air bubbles to separate boluses of fluid moved into the outlet channel 148.

Extending the fluidic priming lines up to the fluid inlet 52 with fluid prime channel 104, 106, 108, 110, 112 enables fluidic improvements over some pre-existing systems. Mainly, at-target priming greatly reduces the necessary pull distance of fluids during use. When fluid line distances are minimized, so too are the total volumes necessary to flush out previous fluids in order to prevent cross contamination.

In an example, fluid transfer is performed by actuating a syringe pump (not shown) connected to the outlet channel 148 and allows for back and forth motion of fluids. Any other pressure differential creating mechanism would work as well, but one with the capability to reverse flow direction is ideal to enable fluid reuse.

For example, a first fluid—e.g., a first reagent or other assay or reaction constituent—can be moved from fluid prime channel 104 through common line 162 into the device 50 through inlet 52 by application of a pressure differential to the manifold and operation of one or more valves. Next, a volume of a second fluid, which may be different from the first fluid—e.g., a second reagent or other assay or reaction constituent—from fluid prime channel 106 is pulled through the through common line 162 to flush any residual amount of the first fluid. An amount of the second fluid equal to the swept volume between junction 116 and inlet 52, typically multiplied by a multiplication factor, is moved through the common line between junction 116 and inlet 52 and is directed into the bypass line 120 instead of the inlet 52 to bypass the device 50. After the flush, an amount of the second fluid can be moved from fluid prime channel 106 through common line 162 into the device 50 through inlet 52. While moving the second fluid into the device 50, an amount of the first fluid previously moved into the device 50 can be moved into the outlet channel 148 through the fluid outlet 54. Next, an amount of the second fluid can be moved from the device 50 through the fluid inlet 52 and back into the fluid prime channel 106, and an amount of the first fluid retained in the outlet channel 148 can be moved from the outlet channel 148 back into the device 50 through fluid outlet 54 for re-use in the device 50.

The at-target priming manifold includes a microfluidic channel system fabricated to be a part of a larger fluidic device to link fluids stored in onboard reservoirs to a specific in-line target region for fluidic exchange. In various examples, the fluidic channel system of the manifold may be fabricated into the main body of a microfluidic cartridge device with the function of delivering sequencing fluids to an integrated flow cell. The channels may be design features on an injection molded device body, or a separately molded distribution layer sealed against the body e.g., substrate 102 to form channels.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An apparatus, comprising:
two or more fluid prime channels connected to a fluid inlet of a fluidic device, the two or more fluid prime channels fluidically coupled to an inlet of a common line at a junction, an outlet of the common line fluidically coupled to the fluid inlet of the fluidic device, wherein the junction is proximate to the fluid inlet;
a first flow control valve operatively associated with a first fluid prime channel of the two or more prime channels to control flow between the first fluid prime channel and the fluid inlet;
a second flow control valve operatively associated with a second fluid prime channel of the two or more prime channels to control flow between the second fluid prime channel of the two or more prime channels and the fluid inlet; one or more outlet channels connected to a fluid outlet of the fluidic device;
a flow control valve operatively associated with each of the one or more outlet channels to control flow between the fluid outlet and the associated outlet channel; and a bypass channel in fluid communication with the common line, wherein the bypass channel is configured to flush at least part of a first fluid from the first fluid prime channel from the common line prior to flowing a second fluid from the second prime channel through the common channel to a separate fluid outlet.

2. The apparatus of claim 1, wherein each flow control valve is a pinch valve or a pneumatically actuated elastomeric valve.

3. The apparatus of claim 1, wherein the bypass channel is configured to introduce air into the common line to separate a first fluid from the first fluid prime channel and a second fluid from the second fluid prime channel.

4. The apparatus of claim 1, wherein the bypass channel is configured as a reuse cache to store the first fluid when the first fluid is flowed back from the fluid inlet.

5. The apparatus of claim 1, wherein fluid is moved through the apparatus and the device by a pressure differential.

6. The apparatus of claim 1, wherein at least two fluid prime channels, but less than all fluid prime channels, merge before the fluid inlet.

7. The apparatus of claim 1, wherein the fluidic device comprises a flow cell.

8. A method, comprising: caching a different fluid in each of two or more fluid prime channels connected to a fluid inlet of a fluidic device, wherein the two or more fluid prime channels are fluidically coupled to an inlet of a common line at a junction, wherein an outlet of the common line is fluidically coupled to the fluid inlet of the fluidic device, wherein the junction is proximate to the fluid inlet, wherein a first flow control valve is operatively associated first with a first fluid prime channel of the two or more fluid prime channels to control flow between the first fluid prime channel and the fluid inlet, wherein a second flow control valve is operatively associated with a second fluid prime channel of the two or more fluid prime channels to control flow between the second fluid prime channel and the fluid inlet; moving at least a portion of a first fluid in a first of the first fluid prime channel through the common line into the fluid inlet; moving the first fluid through a fluid outlet of the fluidic device into an outlet channel connected to the fluid outlet, wherein a flow control valve operatively associated with the outlet channel controls flow between the fluid outlet and the outlet channel; moving at least a portion of a second fluid of the second fluid prime channel through the common line into the fluid inlet; and moving at least a portion of a third fluid through a bypass channel in fluid communication with the common line, wherein the third fluid is air or a wash buffer to flush the first fluid from the common channel to a separate fluid outlet.

9. The method of claim 8, further comprising moving the second fluid through the fluid outlet into the outlet channel.

10. The method of claim 9, further comprising moving at least a portion of the first fluid from the outlet channel into the device through fluid outlet.

11. The method of claim 8, wherein the third fluid is air to separate the second fluid from the first fluid.

12. The method of claim 8, wherein the third fluid is the first fluid reused and flowed back from the fluid inlet into the common line.

13. The method of claim 8, wherein moving the first and second fluid comprises applying a pressure differential to the fluid prime channels.

14. The method of claim 8, wherein the fluidic device comprises a flow cell.

* * * * *